United States Patent Office 3,520,840
Patented July 21, 1970

3,520,840
PROCESS OF PREPARING WATER-SOLUBLE RESINS WHICH ARE SUITABLE AS BINDING AGENTS IN COATING COMPOSITIONS FOR THE ELECTRICAL DEPOSITION OF COATINGS
Adolf Adriaan Que, Rijswijk, South Holland, Netherlands, assignor to N.V. Chemische Industrie Synres, Hoek van Holland, Netherlands, a corporation of the Netherlands
No Drawing. Filed Mar. 6, 1968, Ser. No. 710,720
Claims priority, application Netherlands, Mar. 9, 1967, 6703681
Int. Cl. C08f 21/04; C08g 17/16; C09d 3/64
U.S. Cl. 260—22
18 Claims

ABSTRACT OF THE DISCLOSURE

Water-soluble resins to be used as binding agents in aqueous coating compositions for electrical deposition on metal or metallic substrates are prepared by reacting natural or synthetic drying or semi-drying oils with $\alpha\text{-}\beta$ ethylenically unsaturated dicarboxyic acids or the anhydrides thereof and by esterifying the resulting reaction products first with monohydric cyclic alcohols and subsequently with polyhydric cyclic alcohols.

---

The present invention relates to a process for preparing water-soluble resins which are suitable for use as binding agents in aqueous coating compositions for the electrical deposition of coatings on metals or metallic substrates, which comprises reacting natural or synthetic drying or semi-drying oils with $\alpha\text{-}\beta$ ethylenically unsaturated dicarboxylic acids or the anhydrides thereof.

This invention further relates to a process of electrically depositing coatings on metals or metallic substrates by the use of aqueous coating compositions containing a binding agent based on the reaction products of a synthetic drying or semi-drying oil with an $\alpha\text{-}\beta$ ethylenically unsaturated dicarboxylic acid or anhydride thereof.

Processes for the preparation of such resins and for the electrical deposition of coatings by using aqueous coating compositions containing such a resin as a binding agent are known e.g. from Dutch patent applications Nos. 6405531, 6507277, 6516561 and 6605405.

According to the present invention, the resulting reaction products are first esterified with monohydric cyclic alcohols and subsequently with polyhydric cyclic alcohols, the equivalent ration of the monohydric cyclic alcohols to the anhydride groups in the reaction products being so selected that after the first esterification, $n$ mol anhydride groups per mol of oil remain, wherein $n=1$, 2, or 3, the esterification with the polyhydric cyclic alcohols being carried out with $n$ mol, the products containing free hydroxyl groups finally being esterified with anhydrides of polybasic acids at temperatures at which only the anhydride groups react.

If, for example, $n=2$ or 3, first $n$ mols of the first esterification product of the reaction product may be linked to a monohydric cyclic alcohol by esterifying same with 1 mol of m-hydric cyclic alcohol, and then the esterification with $n-1$ mol of polyhydric cyclic alcohol with the remaining $n-1$ mol of anhydride group per initial oil may be continued. If so desired, after the esterification with anhydrides the resulting products may be further esterified with monohydric alcohols or monoepoxides, such as glycidyl esters of fatty acids or resin acids, and in this last-mentioned case still further with anhydrides.

When the resins according to the invention are prepared, it is also possible to first convert the anhydrides of the polybasic acids with the polyhydric cyclic alcohols, and to have the resultant product reacted with the esterification product of the reaction products of the oil with the monohydric cyclic alcohols.

This last-mentioned variant is especially recommendable if $n>1$ (e.g. 2 or 3), because thus danger of gelation is reduced to a minimum.

The process according to this invention ensures a systematic and uniform building up of the molecules (a preparation of so-called model substances), which is highly desirable for the application of electrophoresis. In the case of uniform molecules, i.e. molecules having a narrow range of molecular weights, there is the advantage that all molecules move in the bath at more or less the same speed, which is highly beneficial to the stability of the bath (no change in the composition of the bath). This uniformity is absent in the manner of preparing alkyd resins and similar products which have been known hitherto, since in these methods the building up of the molecule is not entirely under control, so that an alkyd product having a wide range of molecular weights is obtained. Consequently, it is well-known that by means of the alkyd resins and similar products produced after the known manner only poor results can be obtained with electrophoresis, particularly not as far as the stability of the bath is concerned. Even after a few turnovers (one turnover is completed when in a continuous process the solid weight in the initial bath has been completely extracted from said bath) an electrophoretic bath containing these alkyds is no longer fit for further use, so that the bath must be restored, which is of course uneconomical.

By natural or synthetic drying or semi-drying oils are meant esters of polyols with drying or semi-drying oil fatty acids. In natural oils the polyol is glycerol.

These natural or synthetic drying or semi-drying oils are reacted in a known manner with $\alpha\text{-}\beta$ ethylenically unsaturated dicarboxylic acids, preferably maleic acid, maleic acid anhydride or fumaric acid, to form adducts or addition products, such as, for example when maleic acid (anhydride) is used, the so-called maleinate oils (=maleinized oils).

Maleinized synthetic drying or semi-drying oils can also be obtained by heating a polyol with a mixture of fatty acids and/or resin acids and maleinized fatty acids or only a mixture of maleinized fatty acids.

The polyols used in the synthetic oils may be: glycerol, pentaerythritol, trimethylol propane, epoxy resins, as well as all copolymers containing hydroxyl groups, such as copolymers of styrene and allyl alcohol and the like.

The fatty acids used may be the conventional fatty acids of drying and semi-drying oils, combined with saturated fatty acids and/or synthetic fatty acids, if so desired.

Before, during or after their reaction with the $\alpha\text{-}\beta$ unsaturated dicarboxylic acids the oils can also be modified by reaction of same with monomers, such as styrene, vinyltoluene, cyclopentadiene, acrylic acid, acrylates, etc.

In accordance with this invention the reaction products of the natural or synthetic drying or semidrying oils with the $\alpha\text{-}\beta$ unsaturated dicarboxylic acids, whether or not modified with other monomers, are first partly esterified with monohydric cyclic alcohols and subsequently with polyhydric cyclic alcohols, the carboxyl groups originating from the $\alpha\text{-}\beta$ unsaturated dicarboxylic acids being partly converted into ester groups. The alcohols may be both monocyclic and polycyclic, in which respect those having homocyclic rings as well as those having heterocyclic rings, and aromatic as well as alicyclic alcohols are suitable.

Examples of the monohydric cyclic alcohols to be used are cyclohexanol, methylcyclohexanol tertiary butyl-cyclohexanol, dimethylcyclohexanol, trimethylcyclohexanol, benzyl alcohol, α-methyl benzyl alcohol, phenyl ethanol, 4-isopropyl phenyl ethanol, 2-phenoxy ethanol, furfural, tetrahydrofurfural, tetrahydropyran-2-methanol, monomethylol tricyclodecane, 10-methylol-α-pinene, 10-methylol-dihydropinene, dipentene-7-carbinol, borneol, 8-methoxycarbomethene-7-carbinol, 2-chloro-1-apocamphane-beta-ethanol, etc. Preferably monomethylol tricyclodecane and methylcyclohexanol are used.

Examples of polyhydric cyclic alcohols to be used are cyclohexanediol-1,2, cyclohexanediol-1,4, 1,4-cyclohexane-dimethanol, p-xylene, α,α'-diol, dimethylol tricyclodecane, 2,2'-bis(4-hydroxyclclohexyl)propane, 1,1'-isopropylidene-bis(p-phenylene-oxy)di-2-propanol, 1,1'-isopropylidene-bis(p-phenylene-oxy)-di-e-ethanol, p,p'-bis(hydroxymethyl)diphenyloxide, tris(2-hydroxyethyl)isocyanurate, 2,2,4,4-tetramethyl-cyclobutanediol-1,3-methylglucoside, 1,3-di(N-betahydroxyethyl-4-piperidyl) propane, tetramethylol cyclohexanes, etc. Preferably dimethyloltricyclo decane, cyclohexanediol-1,2, and 1,4-cyclohexanedimethanol are used.

As a matter of fact a monohydric cyclic alcohol is also obtainable by esterifying a polyhydric cyclic alcohol with fatty acids, such that one OH-group remains. Also, a polyhydric cyclic alcohol can be obtained by esterifying 1 mol polyhydric cyclic alcohol with at least one mol fatty acid, such as an $n$-hydric alcohol, by esterifying an $n+2$-hydric alcohol with 2 mols fatty acids, or an $n+1$-hydric alcohol with 1 mol fatty acid.

Examples of anhydrides of polybasic acids used after the esterification with the polyhydric cyclic alcohols are phthalic acid anhydride, maleic acid anhydride, succinic acid anhydride, trimellitic acid anhydride, pyromellitic acid anhydride, anhydrides of maleinized fatty acids and maleinized resin acids, tetrahydrophthalic acid anhydride, and endomethylene tetrahydrophthalic acid anhydride.

Before being used for coating purposes, the resins are rendered soluble in water in a known manner by neutralizing them at least partially with ammonia or amines.

Suitable amines are monoethylamine, diethylamine, triethylamine, dimethylethanolamine, etc.

The resins produced according to this invention are employed as main binders in aqueous coating compositions which are deposited on an article in a known manner, but preferably electrically, i.e. by electrophoresis. To this effect the article or part of the article, which should consist of electrically conductive material, is connected as an anode in a bath of the coating composition, which includes an electrically conductive cathode, whereafter an electric current is passed through the bath.

During electrophoresis of the binders prepared according to this invention the surface of the article is covered with a readily flowing layer of the coating composition, which, after enamelling, produces uniform, smooth and hard films of a high lustre and good adhesion.

One of the reasons for the good properties of the resins according to this invention is their high and uniform molecular weight. As a result of the high molecular weight a very good throwing power (i.e. the power to cover completely the remotest and most poorly accessible parts of the article functioning as the anode), good mechanical characteristics and a good chemical resistance of the lacquer film are obtained. As has been said before, the uniform molecular weight, i.e. the narrow range of molecular weights, is beneficial to the bath stability.

As a result of the extremely good bath stability of the resins according to this invention electrophoresis can be carried out with baths having a low solid content, for example, baths having a solid content lower than 10% by weight and even of 1–5% by weight, and still produce good lacquer films. With the known unstable resins it was necessary to work with solid contents of 20–50% by weight.

This good bath stability, notably at high voltages, is also found in the resins according to this invention which are produced from natural or synthetic drying or semi-drying oils to which only little α-β ethylenically unsaturated dicarboxylic acid has been added (oils having a low degree of maleinizing), and which are also readily soluble in water.

The advantages of working with baths of a low solid content are:

(a) The possibility of working at higher voltages, so that the throwing power is still further improved. Thus it is unnecessary to use auxiliary electrodes, which saves time and money.

(b) Less material is lost when electrophoresis must be interrupted for some reason and the bath must be discarded. The same holds true when the coated articles are rinsed.

(c) The number of turnovers is many times greater than with the known, unstable resins, the economic benefit being correspondingly larger.

Also, the yellowing of the lacquer film admits of easy control, because the oil length of the resin (i.e. its content of fatty acids expressed in triglycerides) can be considerably decreased, even to below 30–40%, which is impossible if esterification is effected with monohydric or with dihydric alcohols only.

In spite of the short oil length, the size and the uniformity of the molecules and the use of the large and rigid cyclic alcohols for the esterification give rise to a final product which produces very hard films, and even so at lower enamelling temperatures and/or shorter enamelling times than with the known products.

Finally, it is an advantage of the resins that they can be used absolutely without the conventional additives, such as surface-active agents and/or anti-oxidants, so that the composition of the bath can be more readily kept constant.

By a proper selection of the amines used for the neutralization and by utilization of a lower neutralizing degree of the resin when the bath is to be replenished, it is not necessary to work with semi-permeable walls or ion-exchangers to keep the pH and the conductivity of the bath at the desired level.

For the production of paints by means of the resins according to this invention the normal pigments suitable for water-soluble resins can be used, while various chromate pigments can be used for giving the product anti-corrosive characteristics.

These good characteristics are not achieved by the coating compositions containing the prior resins.

The invention will now be illustrated in greater detail with reference to the following examples.

EXAMPLE 1

In a reactor comprising an agitator, a thermometer, a reflux condenser and a feeding tube for an inert gas, a mixture of 885 parts (1 mol) of linseed oil and 294 parts (3 mols) of maleic acid anhydride is heated for 1–1½ hours up to a temperature of 220° C., while stirring under an inert gas (isomantle). At 220° C. the addition of maleic acid anhydride was continued until a sample of the reaction composition gave a negative reaction to free maleic acid anhydride with dimethyl aniline, which it did after about 2 hours. The reaction composition was then cooled.

Subsequently, 1179 parts (1 mol) of the maleinized oil prepared as set out above (which, consequently, contained 3 mols anhydride to 1 mol oil, briefly indicated as 1:3 maleinized oil) and 332 parts (2 mols) of tricyclodecane monomethanol were heated for 3 hours at a temperature of 150° C., while stirring under an inert gas, whereafter 196 parts (1 mol) of tricyclodecane dimethanol were added to the reaction product and the mixture was heated again for 3 hours at a temperature of 150° C. Finally, 118 parts (0.8 mol) of phthalic acid anhydride were added to the second esterification product, and the mixture was again heated for 3 hours at a temperature of 150° C., after which the production of the resin was completed.

EXAMPLE 2

1179 parts (1 mol) of 1:3 maleinized oil prepared as in Example 1 were admixed with 332 parts (2 mols) of tricyclodecane monomethanol, while stirring under an inert gas, and heated for 3 hours at a temperature of 150° C., whereafter 314 parts (1 mol) of a product prepared at 150° C. from 196 parts (1 mol) of tricyclodecane dimethanol and 118 parts (0.8 mol) of phthalic acid anhydride were added to the resulting reaction product, and the mixture was heated for 3 hours at a temperature of 150° C., after which the production of the resin was completed.

EXAMPLE 3

1179 parts (1 mol) of the 1:3 maleinized oil prepared as in Example 1 were heated with 228 parts (2 mols) of methylcyclohexanol, while stirring under an inert gas, for 3 hours at a temperature of 150° C., and subsequently esterified with 196 parts (1 mol) of tricyclodecane dimethanol and 118 parts (0.8 mol) of phthalic acid anhydride, successively in the manner described in Example 1, after which the production of the resin was completed.

EXAMPLE 4

1179 parts (1 mol) of 1:3 maleinized oil were admixed with 200 parts (2 mols) of cyclohexanol and heated for 3 hours at a temperature of 150° C., while stirring under an inert gas, and subsequently esterified successively with 196 parts (1 mol) of tricyclodecane dimethanol and 118 parts (0.8 mol) of phthalic acid anhydride in the manner described in Example 1, after which the production of the resin was completed.

EXAMPLE 5

1179 parts (1 mol) of 1:3 maleinized oil were admixed with 312 parts (2 mols) of tertiary butyl cyclohexanol, and the mixture was maintained at a temperature of 150° C. for 3 hours, while stirring under an inert gas. Subsequently the mixture was esterified with, successively, 196 parts (1 mol) of tricyclodecane dimethanol and 118 parts (0.8 mol) of phthalic acid anhydride for the same time and at the same temperature, after which the production of the resin was completed.

EXAMPLE 6

1179 parts (1 mol) of 1:3 maleinized oil were esterified with 216 parts (2 mols) of benzyl alcohol, subsequently with 196 parts (1 mol) of tricyclodecane dimethanol, and finally with 118 parts (0.8 mol) of phthalic acid anhydride for 3 hours and at a temperature of 150° C., while stirring under an inert gas, after which the production of the resin was completed.

EXAMPLE 7

1:2½ maleinized soyabean oil was prepared from 885 parts ((1 mol) of bleached soyabean oil and 245 parts (2½ mols) of maleic acid anhydride in the manner set out in Example 1.

1130 parts (1 mol) of the 1:2½ maleinized soyabean oil were esterified, in the manner set out in Example 1, with 249 parts (1½ mols) of tricyclodecane monomethanol, subsequently with 196 parts (1 mol) of tricyclodecane dimethanol, and finally with 118 parts (0.8 mol) of phthalic acid anhydride, after which the production of the resin was completed.

EXAMPLE 8

1179 parts (1 mol) of 1:3 maleinized linssed oil were esterified, in the manner set out in Example 1, with 332 parts (2 mols) of tricyclodecane monomethanol, subsequently with 240 parts (1 mol) of hydrogenated bisphenol-A, and finally with 118 parts (0.8 mol) of phthalic acid anhydride, after which the production of the resin was completed.

EXAMPLE 9

1179 parts (1 mol) of 1:3 maleinized linseed oil were esterified in the manner set out in Example 1, with 332 parts (2 mols) of tricyclodecane monomethanol, subsequently with 116 parts (1 mol) of cyclohexane-1,2-diol, and finally with 118 parts (0.8 mol) of phthalic acid anhydride, after which the production of the resin was completed.

EXAMPLE 10

1179 parts (1 mol) of 1:3 maleinized linseed oil were esterified in the manner set out in Example 1, with 332 parts (2 mols) of tricyclodecane monomethanol, subsequently with 138 parts (1 mol) of p-xylene-$\alpha,\alpha'$-diol, and finally with 118 parts (0.8 mol) of phthalic acid anhydride, after which the production of the resin was completed.

EXAMPLE 11

1179 parts (1 mol) of 1:3 maleinized linseed il were esterified in the manner set out in Example 1, with 332 parts (2 mols) of tricyclodecane monomethanol, subsequently with 144 parts (1 mol) of 1,4-cyclohexane dimethanol, and finally with 118 parts (0.8 mol) of phthalic acid anhydride, after which the production of the resin was completed.

EXAMPLE 12

1179 parts (1 mol) of 1:3 maleinized linseed oil were esterified in the manner set out in Example 1, with 332 parts (2 mols) of tricyclodecane monomethanol, subsequently with 196 parts (1 mol) of tricyclodecane dimethanol, and finally with 78.5 parts (0.8 mol) of maleic acid anhydride, after which the production of the resin was completed.

EXAMPLE 13

1179 parts (1 mol) of 1:3 maleinized linseed oil were esterified in the manner set out in Example 1, with 332 parts (2 mols) of tricyclodecane monomethanol, subsequently with 196 parts (1 mol) of tricyclodecane dimethanol, and finally with 80 parts (0.8 mol) of succinic acid anhydride, after which the production of the resin was completed.

EXAMPLE 14

1:2 maleinized linseed oil was prepared from 885 parts (1 mol) of linseed oil and 196 parts (2 mols) of maleic acid anhydride in the manner set out in Example 1. Then, 1081 parts (1 mol) of this 1:2 maleinized linseed oil were esterified in the manner set out in Example 1, with 166 parts (1 mol) of tricyclodecane monomethanol, subsequently with 196 parts (1 mol) of tricyclodecane dimethanol, and finally with 115 parts (0.6 mol) of trimellitic acid anhydride, after which the production of the resin was completed.

EXAMPLE 15

In a reactor as referred to in Example 1, a mixture of 530 parts (0.6 mol) of linseed oil, 335 parts (0.4 mol) of dehydrated castor oil and 88.5 parts (10% by weight based on the oil) of styrene was copolymerized in the conventional manner, and subsequently 973.5 parts (1 mol) of the styrenized oil were maleinized with 147 parts (1.5 mols) of maleic acid anhydride in the manner set out in Example 1.

Then, 1120.5 parts (1 mol) of the 1:1½ maleinized styrenized oil obtained were esterified in the manner set out in Example 1, with 83 parts (0.5 mol) of tricyclodecane monomethanol, 196 parts (1 mol) of tricyclodecane dimethanol and 118 parts (0.8 mol) of phthalic acid anhydride, successively, after which the production of the resin was completed.

EXAMPLE 16

In a reactor comprising a reflux condenser and a bridge for the discharge of condensate, a synthetic oil was prepared from 136 parts (1 mol) of pentaerythritol and 1120 parts (4 mols) of linseed oil fatty acid at a temperature of 220–240° C. After the condensation reaction, the resultant oil was maleinized with 196 parts (2 mols) of maleic acid anhydride in the same reactor in the manner set out in Example 1.

Then, 1380 parts (1 mol) of the 1:2 maleinized synthetic oil thus prepared were esterified in the manner set out in Example 1, with 114 parts (1 mol) of methyl cyclohexanol, 196 parts (1 mol) of tricyclodecane dimethanol and 118 parts (0.8 mol) of phthalic acid anhydride, successively, after which the production of the resin was completed.

EXAMPLE 17

1179 parts (1 mol) of 1:3 maleinized linseed oil were esterified in the manner set out in Example 1, with 332 parts (2 mols) of tricyclodecane monomethanol, subsequently with 196 parts (1 mol) of tricyclodecane dimethanol, and finally with 39 parts (0.4 mol) of maleic acid anhydride, after which the production of the resin was completed.

EXAMPLE 18

The reaction products prepared in accordance with Examples 1 to 17 were diluted with triethyl amine and water to 60% clear solutions and processed on paints in a ball mill with iron oxide red. These paints were each deposited separately with a pigment-volume concentration of 10% and a solid content of 10% on metal surfaces by electrophoresis under voltages of 70–200 volts.

Good homogeneous and tight films were obtained which uniformly covered all places of the surfaces of capricious articles as well.

I claim:

1. In a process for preparing water-soluble resins which comprises reacting polyol ester of unsaturated acids selected from the group consisting of natural or synthetic drying oil fatty acids, semi-drying oil fatty acids and resin acids, with $\alpha$–$\beta$ ethylenically unsaturated dicarboxylic acids or anhydrides and esterifying the resulting adduct with an alcohol, an improvement comprising esterifying the adducts first with monohydric cyclic alcohols and subsequently with polyhydric cyclic alcohols, the equivalent ratio of the monohydric cyclic alcohol to the acid or anhydride groups in the adducts being selected such that after the first esterification $n$-mol anhydride groups per mol of oil remain, wherein $n$ is 1, 2 or 3, the esterification with the polyhydric cyclic alcohols being carried out with $n$-mol and finally esterifying the products containing free hydroxyl groups with anhydrides of polybasic acids at a temperature at which only the anhydride groups react.

2. A process as claimed in claim 1 wherein the monohydric alcohol is an alcohol of the group consisting of monomethylol tricyclodecane and methylcyclohexanol.

3. A process as claimed in claim 1 wherein the polyhydric cyclic alcohol is an alcohol of the group consisting of dimethylol tricyclodecane, cyclohexanediol-1,2, and 1,4-cyclohexane dimethanol.

4. A process as claimed in claim 2 wherein the polyhydric cyclic alcohol is an alcohol of the group consisting of dimethylol tricyclodecane, cyclohexanediol-1,2 and 1,4-cyclohexane dimethanol.

5. A process as claimed in claim 1 wherein the polybasic acid anhydride used for the final esterification is an anhydride of the group consisting of maleic acid anhydride, phthalic acid anhydride, a maleinized fatty acid and a maleinized resin acid.

6. A proces as claimed in claim 2 wherein the polybasic acid anhydride used for the final esterification is an anhydride of the group consisting of maleic acid anhydride, phthalic acid anhydride, a maleinized fatty acid and a maleinized resin acid.

7. A process as claimed in claim 3 wherein the polybasic acid anhydride used for the final esterification is an anhydride of the group consisting of maleic acid anhydride, phthalic acid anhydride, a maleinized fatty acid and a maleinized resin acid.

8. A process as claimed in claim 4 wherein the polybasic acid anhydride used for the final esterification is an anhydride of the group consisting of maleic acid anhydride, phthalic acid anhydride, a maleinized fatty acid and a maleinized resin acid.

9. In a process of coating metals or metallic substrates by electrodeposition from an aqueous bath comprising as a resinous binder the product obtained by reacting polyol esters of unsaturated acids selected from the group consisting of natural or synthetic drying oil fatty acids, semi-drying oil fatty acids and resin acids, with $\alpha$-$\beta$ ethylenically unsaturated dicarboxylic acids or anhydrides and esterifying the resulting adduct with an alcohol, an improvement comprising using as a resinuous binder the product obtained by esterifying the adduct first with a monohydric cyclic alcohol and subsequently with a polyhydric cyclic alcohol, the equivalent ratio of the monohydric cyclic alcohol to the acid or anhydride groups in the adducts being selected such that after the first esterification $n$-mol anhydride groups per mol of oil remains, wherein $n$ is 1,2 or 3, the esterification with the polyhydric cyclic alcohols being carried out with $n$-mol and finally esterifying the porducts containing free hydroxyl groups with anhydrides of polybasic acids at a temperature at which only the anhydride groups react.

10. A process as claimed in claim 9 wherein the monohydric cyclic alcohol is an alcohol of the group consisting of monomethylol tricyclodecane and methylcyclohexanol.

11. A process as claimed in claim 9 wherein the polyhydric cyclic alcohol is an alcohol of the group consisting of dimethylol tricyclodecane, cyclohexanediol-1,2 and 1,4-cyclohexane dimethanol.

12. A process as claimed in claim 10 wherein the polyhydric cyclic alcohol is an alcohol of the group consisting of dimethylol tricyclodecane dimethanol.

13. A process as claimed in claim 9 wherein the polybasic acid anhydride used for the final esterification is an anhydride of the group consisting of maleic acid anhydride, phthalic acid anhydride, a maleinized fatty acid and a maleinized resin acid.

14. A process as claimed in claim 10 wherein the polybasic acid anhydride used for the final esterification in an anhydride of the group consisting of maleic acid anhydride, phthalic acid anhydride, a maleinized fatty acid and a maleinized resin acid.

15. A process as claimed in claim 11 wherein the polybasic acid anhydride, used for the final esterification is an anhydride of the group consisting of maleic acid, anhydride, phthalic acid anhydride, a maleinzed fatty acid and a maleinized resin acid.

16. A process as claimed in claim 12 wherein the polybasic acid anhydride used for the final esterification is an anhydride of the group consisting of maleic acid anhydride, phthalic acid anhydride, a maleinized fatty acid and a maleinized resin acid.

17. Water-soluble resins obtained by reacting polyol esters of unsaturated acids selected from the group consisting of natural or synthetic drying oil fatty acids, semi-drying oil fatty acids, and resin acids with $\alpha$-$\beta$ ethylenically unsaturated dicarboxylic acids or anhydrides and esterifying the resulting adduct first with a monohydric cyclic alcohol and subsequently with a polyhydric cyclic alcohol, the equivalent ratio of the monohydric cyclic alcohol to the acid or anhydride groups in the adducts being selected such that after the first esterification $n$-mol anhydride groups per mol of oil remain, wherein $n$ is 1,2 or 3, the esterification with the polyhydric cyclic alcohol being carried out with $n$-mol and finally esterifying the products containing free hydroxyl groups with anhydrides of polybasic acids at a temperature at which only the anhydride groups react.

18. Articles provided with a resinous coating obtained by the process according to claim 9.

References Cited

UNITED STATES PATENTS

| | | | |
|---|---|---|---|
| 3,200,058 | 8/1965 | Oster | 204—181 |
| 3,253,938 | 5/1966 | Hunt | 260—22 |
| 3,300,424 | 1/1967 | Hoenel et al. | 260—21 |
| 3,369,983 | 2/1968 | Hart et al. | 204—181 |
| 3,412,056 | 11/1968 | Crawford et al. | 260—22 |

DONALD E. CZAJA, Primary Examiner

R. W. GRIFFIN, Assistant Examiner

U.S. Cl. X.R.

260—23, 23.7, 29.2, 32.4, 32.6, 40, 77; 117—132, 161, 167; 204—181